United States Patent [19]
Akins

[11] Patent Number: 5,127,368
[45] Date of Patent: Jul. 7, 1992

[54] FEEDER FOR ANIMALS

[76] Inventor: Edward A. Akins, Box 158, Winnipeg, Manitoba, Canada, R2H 3B4

[21] Appl. No.: 703,094

[22] Filed: May 22, 1991

Related U.S. Application Data

[63] Continuation-in-part of Ser. No. 527,209, May 23, 1990, Pat. No. 5,058,531, which is a continuation-in-part of Ser. No. 375,262, Jun. 3, 1989, Pat. No. 4,957,067.

[51] Int. Cl.[5] ............................. A01K 1/00; A01K 5/00
[52] U.S. Cl. .................................................. 119/60
[58] Field of Search .................................... 119/58, 60

[56] References Cited

U.S. PATENT DOCUMENTS

| | | | |
|---|---|---|---|
| D. 264,138 | 4/1982 | Harden | 119/60 X |
| 2,768,607 | 10/1956 | McClure, Jr. | 119/60 |
| 3,777,713 | 12/1973 | Deats | 119/60 |
| 3,834,353 | 9/1974 | Groezinger | 119/60 |
| 3,851,624 | 12/1974 | Peak | 119/60 |
| 4,346,671 | 8/1982 | Wagner | 119/60 |
| 4,574,740 | 3/1986 | Koebel | 119/60 |
| 4,706,609 | 11/1987 | Delichte | 119/60 |
| 4,957,067 | 9/1990 | Akins | 119/60 |
| 5,058,531 | 10/1991 | Akins | 119/60 |

FOREIGN PATENT DOCUMENTS

| | | | |
|---|---|---|---|
| 2540705 | 8/1984 | France | 119/60 |
| 1267914 | 3/1972 | United Kingdom | 119/60 |
| 1513180 | 6/1978 | United Kingdom | 119/60 |
| 1596618 | 8/1981 | United Kingdom | 119/60 |

*Primary Examiner*—Robert P. Swiatek
*Assistant Examiner*—Nicholas D. Lucchesi
*Attorney, Agent, or Firm*—Adrian D. Battison; Stanley G. Ade; Murray E. Thrift

[57] ABSTRACT

A feeder for receiving a bale confined within a cylindrical body of the feeder comprises a cylindrical skirt and a plurality of bars upstanding from the skirt for confining animals outside of the feeder for accessing the bale within the feeder. The skirt is manufactured from a single integral sheet of metal which is bent about parallel horizontal lines to form coplanar skirt portions and flange portions and is then curved to form into the cylindrical shape. The upstanding bars are then simply welded to the skirt portions so that the structural strength for the feeder is provided by the cooperation between the curved and bent skirt sheet and by the vertical bars. The design reduces the materials required in the conventional hoop members and reduces the amount of labour required for manufacture while providing equal or increased strength.

15 Claims, 4 Drawing Sheets

FEEDER FOR ANIMALS

This application is a continuation-in-part of application, Ser. No. 527,209, filed May 23rd, 1990 and now issued as U.S. Pat. No. 5,058,531 which is a continuation-in-part application of Ser. No. 375,262, filed Jun. 3rd, 1989 and issued to U.S. Pat. No. 4,957,067.

This invention relates to a feeder for receiving a large cylindrical bale for distributing the bale to a number of animals which are particularly but not exclusively cattle.

Round bale feeders are well known and manufactured in large numbers. The feeders are designed to receive a single cylindrical bale of feed material which is confined within the bale feeder for access by a number of animals surrounding the bale feeder. The most simple feeders of this type comprise simply a plurality of circular rails which are connected to form a cylindrical body of a size to fit around the periphery of the bale. The connecting members comprise either vertical bars or slant bars so that the animal can pass its head through the bars to reach the feed from the bale which is confined within the feeder. Often a sheet metal skirt is provided from the lowermost ring which rests upon the ground to a height of the order of eighteen inches to assist in confining the feed material inside the feeder. Bale feeders of this type are manufactured in large numbers and by a large number of manufacturers.

One type of feeder which is becoming more popular is generally of the same construction as previously described except that the feeder is formed by a lower band reaching up approximately to the shoulders of the animal and a plurality of elements which project upwardly from the upper edge of the band. Each element comprises a U-shaped frame member which is generally tubular in construction with the U-shape inverted to define a curved upper edge and the legs extending downwardly and connected to the band. This type of construction tends to be more rugged than the hoop type construction. In addition in between each element and the next element is a path or channel within which the animal can place its head with that path being open at the top so that the animal can lift its head out freely without contacting an upper rail or hoop of the feeder.

One example of a feeder of this general type is shown in British patent 1292185 which includes the outer band and element but is of a modified construction in that it includes a hopper feeder arrangement centrally of the outer band. The tombstone feeder does however continue to have the problem of the waste material since the animal can pull the material outwardly from the bale to the outside of the feeder where it is trampled and wasted.

One improved arrangement is shown in U.S. Pat. No. 4,706,609 (Delichte) which shows an arrangement of the hoop type feeder in which an outer frame is provided having bars spaced sufficiently to allow the animal to pass its head between the bars into the area between the outer frame and an inner frame with the inner frame confining the bale away from the outer frame. In this way the animal reaches in through the outer frame to the bale confined inside of the inner frame and tends to eat with its head between the inner and outer frames so that any material falling from the mouth of the animal collects between the inner and outer frames and thus cannot be trampled. This feeder has therefore achieved some success since it resolves the problem of feed waste and significantly reduces waste to an amount which is economically viable despite the increased cost of the device due to the increased complexity.

This device does however have particular problems in that it is larger than conventional feeders and cannot be broken down into simple parts so that transportation of the large bulky feeder becomes very difficult and expensive. Conventionally feeders are often broken down into angularly separated parts which can be stacked readily one on top of the other allowing large numbers of feeders to be transported and subsequently bolted together to form the complete circular feeder. This transportation system is not possible in the improved feeder of Delichte leading to further increases in cost relative to conventional feeders.

However in all cases, a large amount of time and labour is involved in welding the various rings, bars and sheets forming the feeder together which leads to a relatively high cost.

SUMMARY OF THE INVENTION

It is one object of the present invention to provide an improved design of feeder which may reduce the cost of labour and materials involved in manufacturing a feeder of this general type.

According to the invention, therefore, there is provided a feeder for receiving bale for distributing the bale to a number of animals, the feeder comprising a skirt portion which is of generally cylindrical shape for surrounding the bale with a longitudinal axis of the cylindrical shape extending vertically, one axial end of the skirt portion having means thereon for resting on the ground such that the skirt portion is generally upstanding from the ground to a second axial end thereof, and a plurality of bars having lower portions thereof fastened to the skirt portion so that the bars extend generally upwardly from the second axial end of the skirt portion for confining the animal on an exterior of the cylindrical skirt portion, the skirt portion comprising a single integral sheet of metal curved about vertical lines therein to follow the cylindrical shape and bent about spaced horizontal lines therein to define an upper sheet portion and a lower sheet portion with both sheet portions lying in a common imaginary cylindrical surface surrounding said vertical longitudinal axis, an upper flange portion above the upper sheet portion and bent relative to the upper sheet portion out of the cylindrical surface to lie at an angle thereto, an intermediate flange portion bent relative to both the upper and lower sheet portions to lie out of the cylindrical surface and a lower flange portion below the lower sheet portion and bent relative to the lower skirt portion to lie out of the cylindrical surface, said lower portions being connected to the skirt portion so as to extend from a position at least aligned with the lower sheet portion to a position above the upper sheet portion.

One or more embodiments of the invention will now be described in conjunction with the accompanying drawings.

BRIEF DESCRIPTION OF THE DRAWINGS

In the drawings like characters of reference indicate corresponding parts in the different figures.

DETAILED DESCRIPTION

The feeder comprises an outer frame portion generally indicated at 10 and a plurality of tombstone frame members 11.

Figure 1:
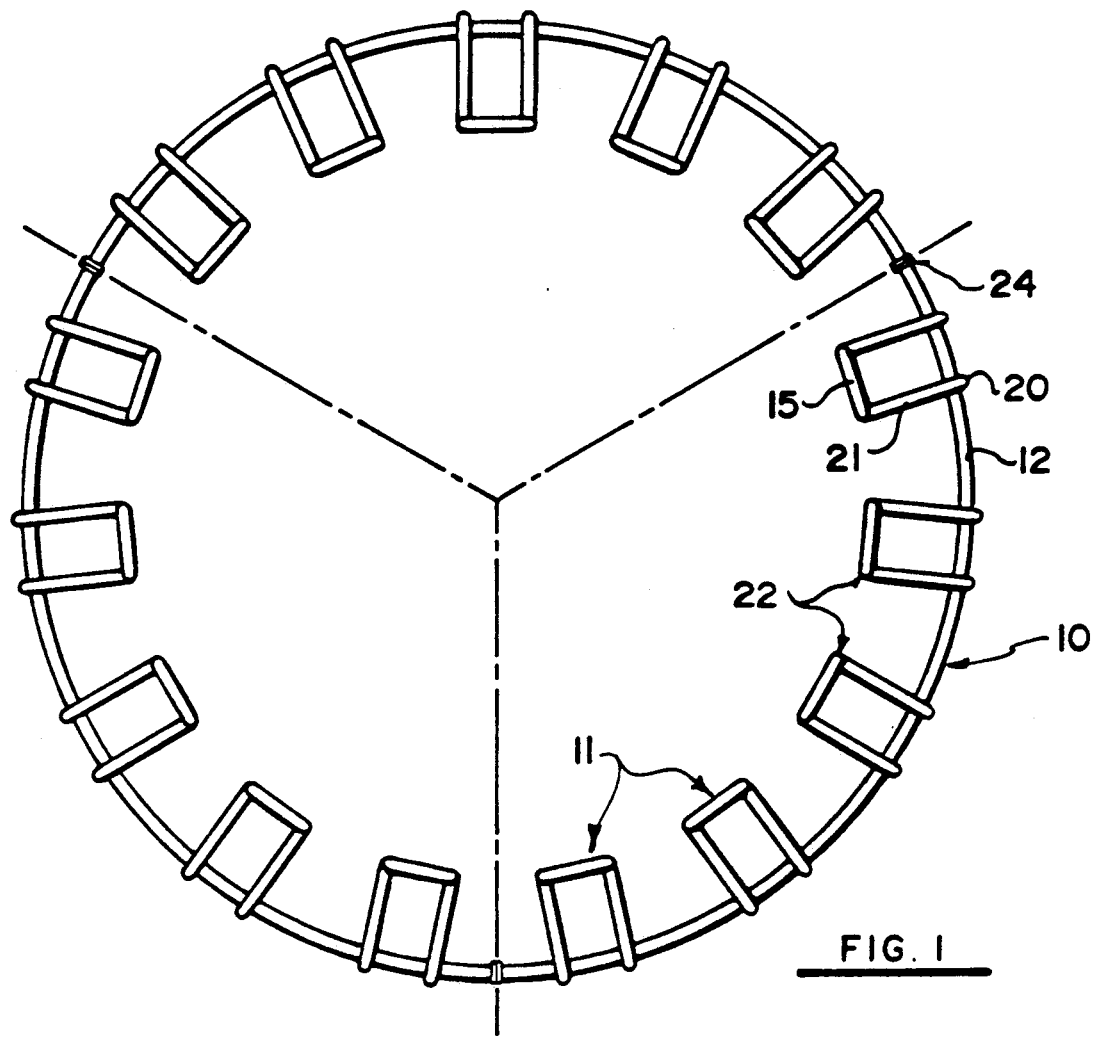
FIG. 1 is a top plan view of a feeder of the type shown in U.S. Pat. No. 4,957,067.

The outer frame 10 comprises three circular hoops 12, 13 and 14 which surround substantially the whole of the feeder and define a circular shape for the outer frame portion in plan as shown in FIG. 1.

Each of the tombstone frame members comprises a metal tube bent to form an inverted U-shaped member with a curved upper portion 15 and a pair of depending legs 16 and 17. The depending legs 16 and 17 are welded to the outer frame portion 10 and thus support the hoops 12, 13 and 14 at spaced positions.

Figure 3:
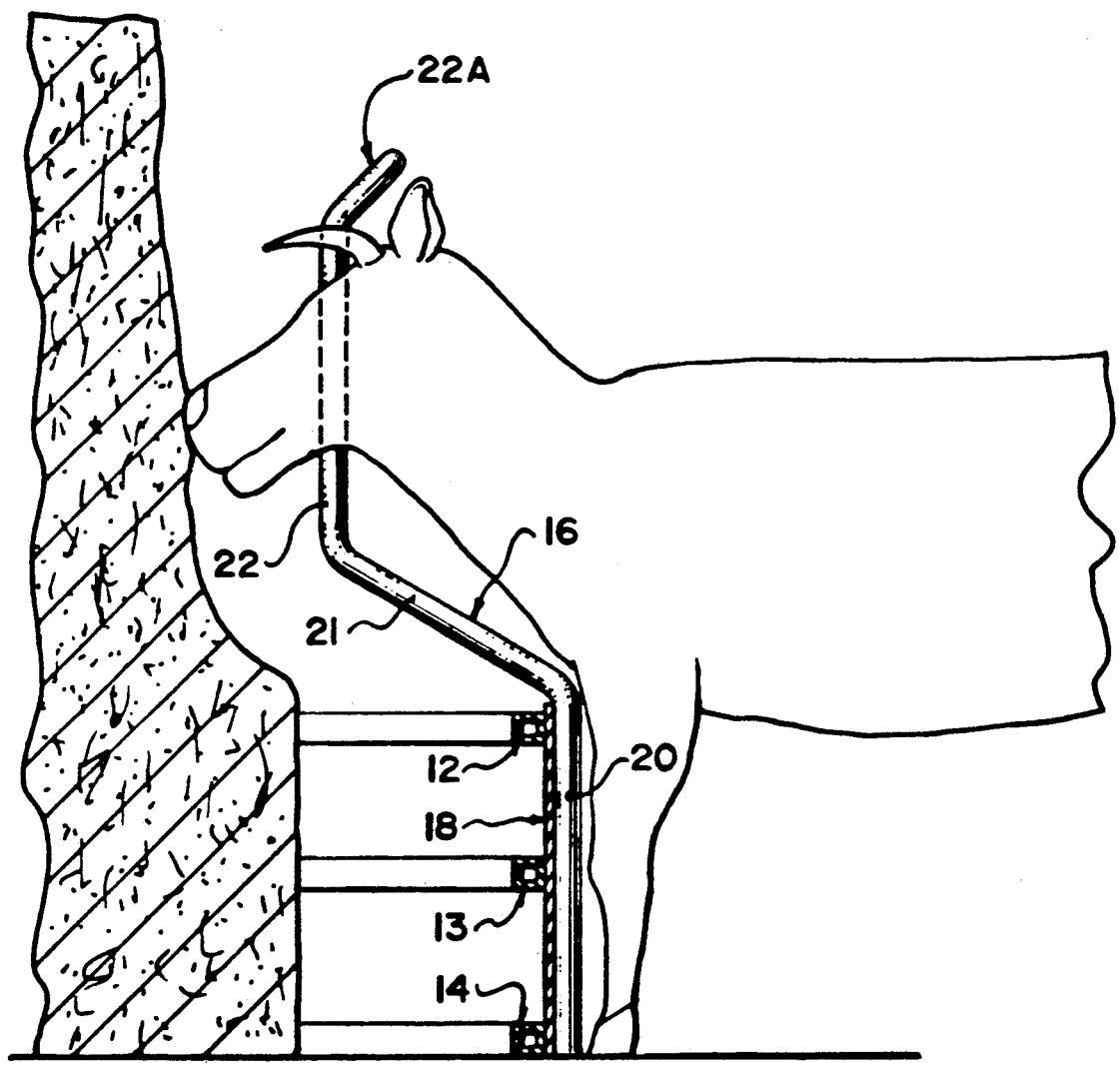
FIG. 3 is a cross sectional view through one side of the feeder showing the position of a bale and showing one slight modification relative to the device as shown in FIG. 1.

As shown in FIG. 3, the hoops 12, 13 and 14 are formed from tubular members. In addition there is provided an optional sheet metal skirt 18 welded to the tubular members. The skirt assists in preventing the escape of feed material from the area inside of the outer frame portion.

The "tombstone" members are so called in view of the fact that in elevational view they appear as a shape of tombstone and each is separated from the next without any coupling element across the top of the frame members so that the animal can reach between each tombstone member and the next tombstone member by placing its head over the top of the tombstones down between the tombstones for reaching into the material for feeding.

Figure 2:
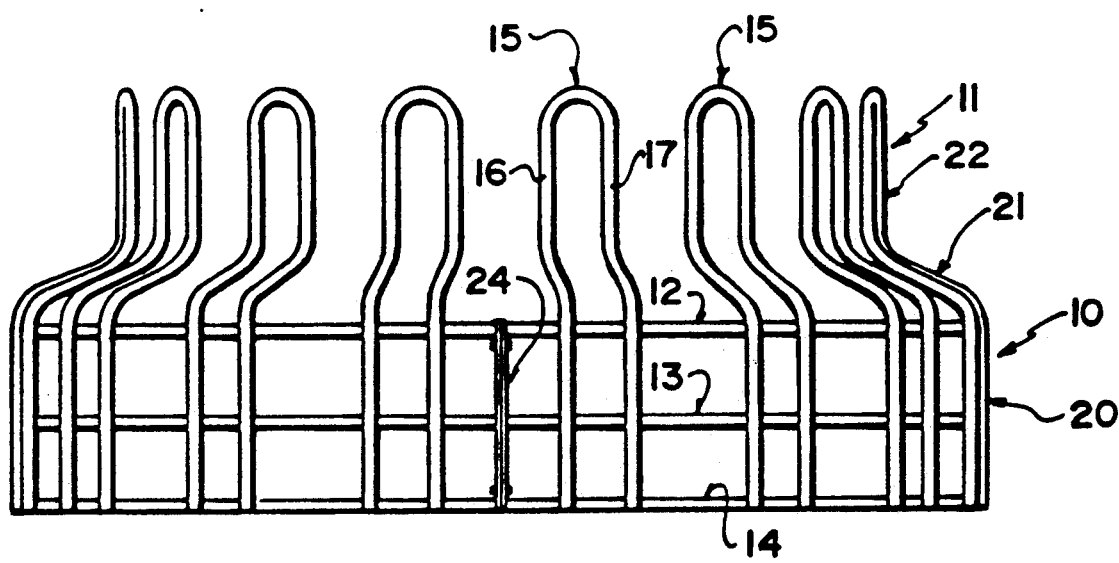
FIG. 2 is a side elevational view of the feeder of FIG. 1.

Each of the tombstone members as shown in FIGS. 1 and 2 includes a portion 20 welded to the outer surface of the outer frame and providing structural strength for the outer frame and also rigidly attaching the tombstone member to the outer frame so that it is resistant to breakage.

A first portion 21 of the tombstone member is inclined inwardly and upwardly toward the bale. A second portion 22 extends vertically upwardly so that all of the second portions 22 lie on a circle having a diameter less than that of the outer frame. The second portions 22 as best shown in FIG. 1 define a circle which is shaped to confine the bale within the area bounded by the second portions so that the bale is held away from the outer frame portion.

As best shown in FIG. 3 there is a modified arrangement in which the upper edge of the second portions 22 includes an outwardly curved portion 22A which defines a feed in surface by which the bale can dropped into the area centrally of the bale and centered into the position confined by the second portions of the tombstone members.

As shown in FIG. 3 the height of the outer frame is of the order of eighteen inches to two feet so that it reaches just to the brisket of the animal that is below the shoulder or just at the top of the leg. The neck of the animal extends over the inclined portion 21 allowing the head to reach between the tombstone members for feeding. When the bale is closely adjacent the tombstone members the animal can reach the feed material without pressing its head fully through the tombstone members. When it is necessary to reach through, when the bale is becoming smaller, the smaller animals can push their head directly between the tombstone members whereas larger animals or horned animals will need to lift their head over the tombstone member and slide it down between two tombstone members.

As best shown in FIG. 1 the spacing between the legs of the tombstone members increases toward the outer frame so that the animal can reach down to a position adjacent its front feet just inside the outer frame and can move its head from side to side in view of the increased spacing between the tombstone members.

In FIGS. 1 and 2 it is shown that the frame is broken into three separate portions which are bolted together as indicated at 24. This can be done for ease of transportation, but in some cases where transportation is not a problem, the feeder can be made as an integral unit. A suitable flange is welded on the ends of the hoops 12, 13 and 14 thus forming a portion which extends over a 120° angle. When bolted together the hoops form the full 360° defining a circular feeder. However when separated it will be appreciated that each portion can be stacked on top of the next adjacent portion with the outer periphery of one portion engaging the inner periphery of the next adjacent portion and the tombstone members either directly overlying each other or offset so that the tombstone members of one lie intermediate the tombstone members of the next adjacent portion. In this way transportion of the feeders requires very little space.

The device described above has the following advantages.

(1) it is very simple to position the feeder over the bale or to drop the bale into the interior of the feeder. This is because the position on the feeder where the bale is confined includes an inclined feed in portion so that the portion that first engages the bale is of increased diameter leading toward the most confined diameter portion.

(2) The bale always remains centered within the feeder.

(3) The amount of wastage outside the feeder is dramatically reduced since the animal is encouraged to eat with its head inside the outer frame so that any material dropping collects inside the outer frame and can be eaten without being trampled.

(4) The fact that the tombstone members bend away from the animal prevent the animal from pressing its shoulders against the tombstones thus reducing forces tending to break the feeder.

(5) The cattle cannot push the feeder around within the feed lot which can cause further damage or can locate it at places where its not required and can disturb the feed within the feeder.

(6) It provides the advantages of the ring feeder described above including inner and outer frames and yet includes the advantage of the tombstone feeder which has increased rigidity, the improved access by the animal and the reduced danger of the animal having its head trapped.

(7) The product can be easily packaged and shipped thus reducing transportation costs.

(8) The product is equal to or only slightly more expensive than a conventional tombstone feeder accordingly can be sold at reasonable price or a good profit.

(9) The configuration of the tombstone members by which the spacing between the members increases and decreases along the length of the members allows easy manouverability of the animals head.

(10) The number of stations for animal feeding around the feeder is increased by the larger diameter of the frame.

In an alternative arrangement (not shown) the feeder can be of the conventional bar type with bars inclined inwardly from the top of the outer frame to a reinforcing ring surrounding the bale and connecting each frame member or bar to the next adjacent.

Figure 4:
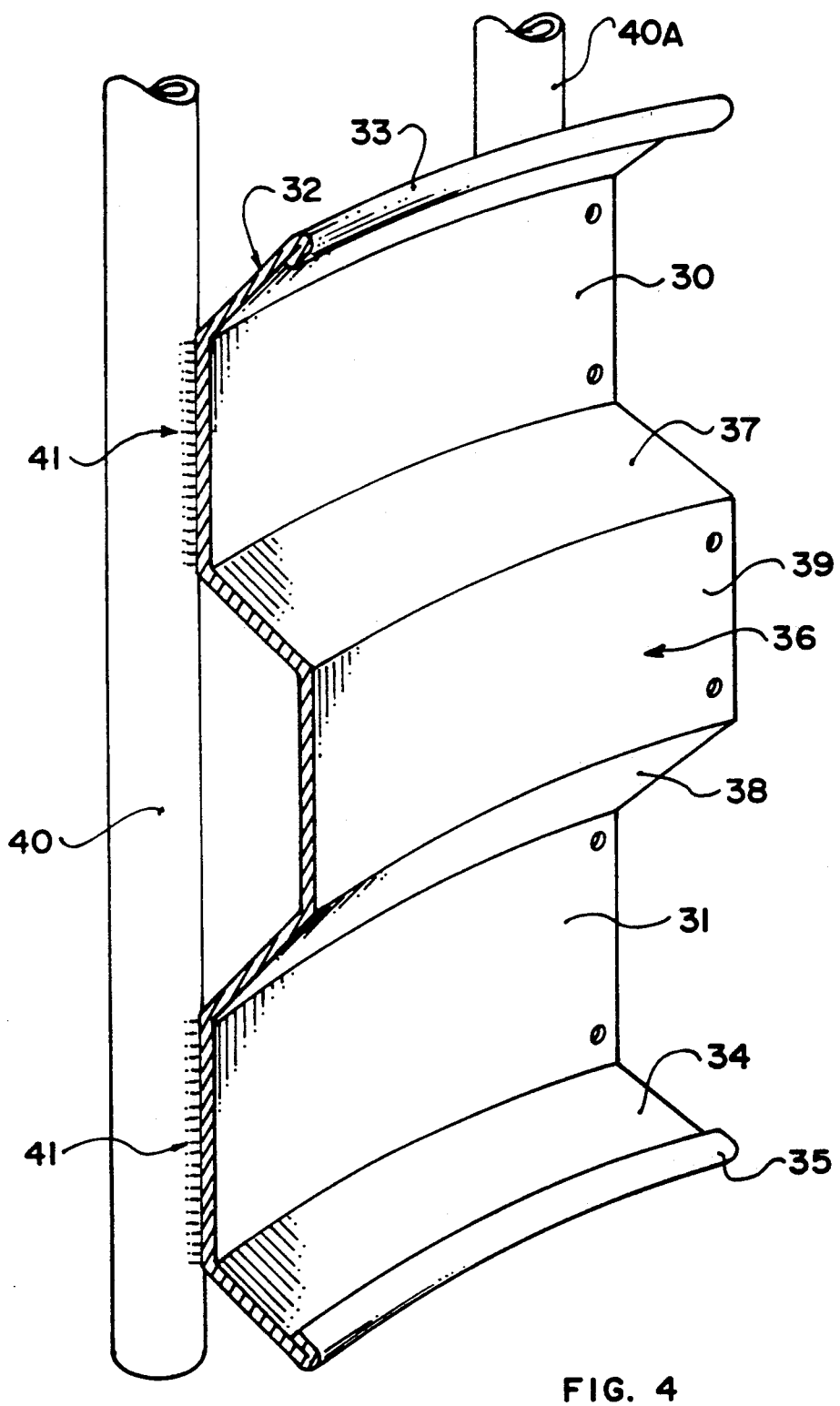
FIG. 4 is a cross-sectional view through a lower portion of a modified arrangement of the feeder according to the present invention.

In the alternative arrangement shown in FIG. 4, the skirt portion of the feeder is formed from a single sheet of metal which is formed to define two vertically spaced skirt portions including an upper skirt portion 30 and a lower skirt portion 31. At the top of the upper skirt portion 30 formed an inwardly and upwardly turned upper flange portion 32 which lies at an angle of the order of 45° to the imaginary cylindrical surface containing the skirt portions 30 and 31. The uppermost edge 33 of the upper flange portion 32 is folded back to present a clean non-cutting edge for engagement with the animal. A similar arrangement is provided at the bottom of the lower skirt portion 31 and defined by an inclined upper flange portion 34 which projects inwardly and downwardly from a lowermost edge of the lower skirt portion 31. A folded edge 35 is provided at the lowermost edge of the flange 34.

In between the portions 30 and 31 is provided an intermediate flange portion generally indicated at 36 including an upper inclined flange portion 37 and a lower inclined flange portion 38 each of which is substantially at 45° to the imaginary cylinder and spaced by a vertical connecting portion or third skirt portion 39 parallel to the skirt portions 30 and 31 and thus lying on a second imaginary cylinder radially inwardly spaced relative to the portions 30 and 31.

One leg or lower bar portion of the tombstone element or bar indicated at 40 then is welded to the outer surface of the portions 30 and 31 as indicated by weld line 41. The feeder is thus formed structurally solely from the single sheet of metal and by the legs forming the tombstone elements. The amount of welding is therefore very limited and it constitutes merely spot welding of the legs to the skirt as indicated.

The leg 40 may also form a bar or rail of a conventional bar type feeder where each of the bars is independant from the others and is welded at the upper end to a horizontal ring which connects the bars to provide the necessary structural strength for the device at the top end of the device. The strength of the lower end is however provided simply by the skirt and by the attachment of the bars to the skirt.

The skirt including the flanges and the return portion can be formed by a roll forming system which takes a flat sheet of metal and forms it by a plurality of sequentially arranged rollers which deform the sheet into the required shape including the flanges. Subsequently a curvature can be applied to the whole sheet about the central axis of the feeder by passing the roll formed sheet through a plurality of further rollers.

In FIG. 4, the feeder is of the conventional tombstone type in that the tombstone is formed from legs 40 and 40A which project vertically upwardly from the outer surface of the skirt including the portions 30 and 31 to an upper curved section (not shown). In this case the legs of the tombstone elements are simply welded to the portions 30 and 31.

Figure 5:
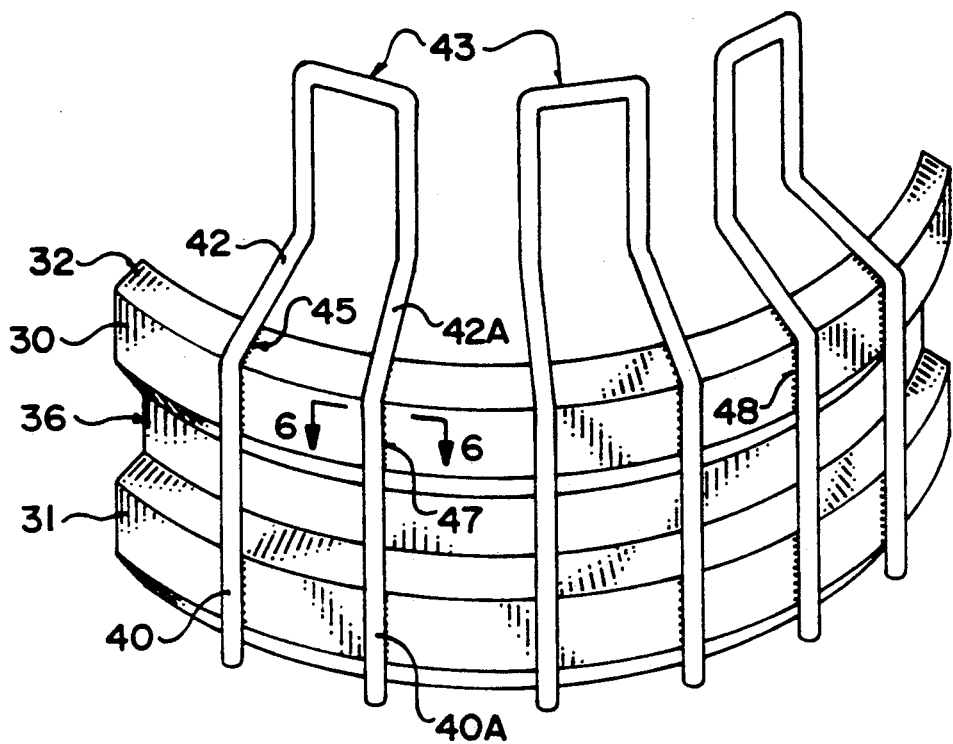
FIG. 5 is an isometric view of one section of a feeder according to the present invention.

In FIG. 5 the feeder is of the inturned tombstone type shown in the above U.S. Patent in which the tombstone elements includes legs 40 and 40A and inwardly inclined sections 42 and 42A and finally U-shaped section 43 which again lies on a cylindrical surface spaced radially inwardly from the cylindrical surface containing the legs 40 and 40A and the portions 30 and 31 of the skirt. In this case the inclined portions 42A and 42 are inclined at the same angle as the upper flange 32 so that a lower most surface of the inclined portions 42 and 42A lies in contact with the upper flange portion 32. This line of contact can be welded as indicated at the weld line 45 to provide increased rigidity of the device.

The folding of the skirt by bending at the horizontal lines provides a sufficient degree of structural rigidity to avoid the necessity for the conventional hoops. This bending cooperates with the curvature of the skirt to form the cylindrical shape. Therefore the cooperation with the lower portions of the bars either of the tombstone type or of the conventional slant bar type is sufficient to provide the required structural rigidity of the whole device. It will be appreciated that in use the animals often lean on the feeder and tend to push the feeder vigorously forwardly to obtain access to feed which can be just outside the reach of the animal. The feeders must therefore provide sufficient strength and to prevent distortion from the required cylindrical shape.

The manufacture of the skirt from a single piece bent and curved as set forth above significantly reduces the cost of the materials and also can significantly reduce the cost of labour used in the welding and manufacturing process. A significantly reduced amount of welding is necessary and in addition the set up of the parts in a jig is very much more simple.

As shown in FIG. 5, the feeder is preferably manufactured in three or more separate arcuate sections for transportation allowing the sections to be coupled by bolting together slightly overlapped sections of the skirt.

Figure 6:
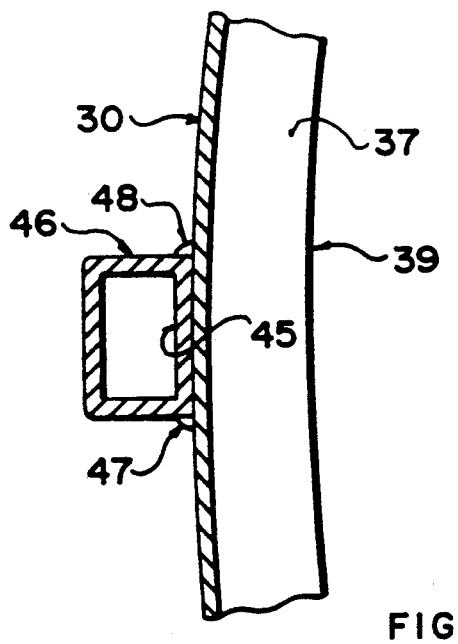
FIG. 6 is a cross-sectional view along the lines 6—6 of FIG. 5.

As shown in FIG. 6, each of the bars 40, is rectangular in cross-section and formed from a tubular material with two parallel sides 45 longer than the sides 46. One of the longer sides 45 contacts directly against the outer surface of the portions 30 and 31 and is welded thereto by weld lines 47 and 48. The weld lines extending along the full length of the line of contact between the sides edges of the side 45 and the respective portions 30, 31 as best shown in FIG. 5. The bars 40 and the portions 30, 31 thus present cooperating flat surfaces for ready welding with reduced complexity of the necessary jigs.

In addition it has surprisingly been found that the cooperation of the single sheet forming the skirt and the vertical bars welded thereto, without the provision of or necessity for any other structural interconnection between the bars at the skirt, provides improved strength of the skirt and resistance to bending in a direction inwardly toward the centre of the feeder.

In use, the main force applied by the animal to the feeder is a pushing force tending to bend the feeder about a vertical line at the point of contact with the feeder. Surprisingly therefore the removal of the conventional hoops surrounding the feeder has led to an arrangement which has increased strength with reduced material and significantly reduced labour costs for manufacture.

In an alternative arrangement (not shown) the legs or lower bar portions 40 are welded on the inside of the skirt to the portion 36. In such an arrangement a second or even third portion parallel to the portion 36 will be provided by an increased number of fold lines in the horizontal direction.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A feeder for receiving a bale for distributing the bale to a number of animals, the feeder comprising a skirt portion which is of generally cylindrical shape for surrounding the bale with a longitudinal axis of the cylindrical shape extending vertically, one axial end of the skirt portion having means thereon for resting on the ground such hat the skirt portion is generally upstanding form the ground to a second axial end thereof, and a plurality of bars having lower bar portions thereof fastened to the skirt portion so that the bars extend generally upwardly from the second axial end of the skirt portion for confining an animal on an exterior of the cylindrical skirt portion, the skirt portion comprising a single integral sheet of metal curved about vertical lines therein to follow the cylindrical shape and bent about spaced horizontal lines therein to define an upper sheet portion and a lower sheet portion with both sheet portions lying in a common imaginary cylindrical surface surrounding said vertical longitudinal axis, an upper flange portion above the upper sheet portion and bent relative to the upper sheet portion out of the cylindrical surface to lie at an angle thereto, an intermediate flange portion bent relative to both the upper and lower sheet portions to lie out of the cylindrical surface and a lower flange portion below the lower sheet portion and bent relative to the lower sheet portion to lie out of the cylindrical surface, said lower bar portions being connected to the skirt portion so as to extend from a position at least aligned with the lower sheet portion to a position above the upper sheet portion, each said lower bar portion having a surface thereof lying in said imaginary cylindrical surface so as to lie in contact with said lower sheet portion and said upper sheet portion, each said lower bar portion surface being welded to both the upper sheet portion and the lower sheet portion.

2. The feeder according to claim 1 wherein the feeder includes means interconnecting said bars and extending in a direction angularly around said axis, said means consisting solely of said single integral sheet of metal.

3. The feeder according to claim 1 wherein structural strength for the feeder is provided solely by the single integral sheet of metal and said plurality of bars.

4. The feeder according to claim 1 wherein the intermediate flange portion includes a third sheet portion lying in a second imaginary cylindrical surface radially spaced from said imaginary cylindrical surface, and further sheet portions each interconnecting a respective one of said upper and lower sheet portions to said third sheet portion, said further sheet portions being inclined to each of said imaginary cylindrical surface and said second imaginary cylindrical surface.

5. The feeder according to claim 4 wherein the further sheet portions are inclined at an angle of the order of 45° to said imaginary cylindrical surface and said second imaginary cylindrical surface.

6. The feeder according to claim 1 wherein the upper flange portion is inclined upwardly and inwardly of the imaginary cylindrical surface.

7. The feeder according to claim 6 wherein each bar includes an upper bar portion thereof inclined upwardly and inwardly from the lower bar portion thereof with the upper bar portion fastened to said upper flange portion.

8. The feeder according to claim 1 wherein the upper flange portion and the lower flange portion each include an outermost edge thereof which is folded.

9. The feeder according to claim 1 wherein said surface of said each lower bar portion is welded to a radially outwardly facing surface of each of said upper and lower sheet portions.

10. The feeder according to claim 1 wherein each bar is formed of tubular material of rectangular cross section with one flat surface thereof lying in said imaginary cylindrical surface and welded to said upper and lower sheet portions.

11. The feeder according to claim 1 wherein each bar is formed of a tubular material having a rectangular cross section with two longer sides and two shorter sides.

12. The feeder for receiving a bale for distributing the bale to a number of animals, the feeder comprising a skirt portion which is of generally cylindrical shape for surrounding the bale with a longitudinal axis of the cylindrical shape extending vertically, one axial end of the skirt portion having means thereon for resting on the ground such that the skirt portion is generally upstanding from the ground to a second axial end thereof, and a plurality of bars having lower bar portions thereof fastened to the skirt portion so that the bars extend generally upwardly from the second axial end of the skirt portion for confining an animal on an exterior of the cylindrical skirt portion, the skirt portion comprising a single integral sheet of metal curved about vertical lines therein to follow the cylindrical shape and bent about spaced horizontal lines therein to define an upper sheet portion and a lower sheet portion with both sheet portions lying in a common imaginary cylindrical surface surrounding said vertical longitudinal axis, an upper flange portion above the upper sheet portion and bent relative to the upper sheet portion out of the cylindrical surface to lie at an angle thereto, an intermediate flange portion bent relative to both the upper and lower sheet portions to lie out of the cylindrical surface and a lower flange portion below the lower sheet portion and bent relative to the lower sheet portion to lie out of the cylindrical surface, said lower bar portions being connected to the skirt portion so as to extend from a position at least aligned with the lower sheet portion to a position above the upper sheet portion, said intermediate flange portion including a third sheet portion lying in a second imaginary cylindrical surface radially spaced from said imaginary cylindrical surface, and further sheet portions each interconnecting a respective one of said upper and lower sheet portions to said third sheet portion, said further sheet portions being inclined to each of said imaginary cylindrical surface and said second imaginary cylindrical surface.

13. The feeder according to claim 12 wherein the feeder includes means interconnecting said bars and extending in a direction angularly around said axis, said means consisting solely of said single integral sheet of metal.

14. The feeder according to claim 12 wherein structural strength for the feeder is provided solely by the single integral sheet of metal and said plurality of bars.

15. The feeder according to claim 12 wherein the further sheet portions are inclined at an angle of the order of 45° to said imaginary cylindrical surface and said second imaginary cylindrical surface.

* * * * *